(12) United States Patent
Scicluna

(10) Patent No.: US 10,143,278 B2
(45) Date of Patent: Dec. 4, 2018

(54) SUITCASE MOLDING PROCESS WITH OVERLAY

(71) Applicant: TUMI, INC, South Plainfield, NJ (US)

(72) Inventor: Paul V. Scicluna, Penndel, PA (US)

(73) Assignee: TUMI, INC., South Plainfield, NJ (US)

( * ) Notice: Subject to any disclaimer, the term of this patent is extended or adjusted under 35 U.S.C. 154(b) by 160 days.

(21) Appl. No.: 15/200,579

(22) Filed: Jul. 1, 2016

(65) Prior Publication Data
US 2017/0000227 A1    Jan. 5, 2017

Related U.S. Application Data

(60) Provisional application No. 62/187,622, filed on Jul. 1, 2015.

(51) Int. Cl.
| | |
|---|---|
| A45C 5/02 | (2006.01) |
| A45C 5/03 | (2006.01) |
| A45C 13/36 | (2006.01) |
| B29C 51/14 | (2006.01) |
| B29C 51/10 | (2006.01) |
| B29C 53/04 | (2006.01) |
| A45C 5/14 | (2006.01) |
| B29L 9/00 | (2006.01) |
| B29L 31/00 | (2006.01) |

(52) U.S. Cl.
CPC .......... *A45C 5/02* (2013.01); *A45C 5/03* (2013.01); *A45C 5/14* (2013.01); *A45C 13/36* (2013.01); *B29C 51/105* (2013.01); *B29C 51/14* (2013.01); *B29C 53/04* (2013.01); *A45C 2005/037* (2013.01); *B29L 2009/00* (2013.01); *B29L 2009/001* (2013.01); *B29L 2031/7418* (2013.01)

(58) Field of Classification Search
CPC .. A45C 5/02; A45C 5/04; A45C 13/36; A45C 2005/037; A45C 5/14; B29C 51/14; B29C 51/105; B29C 53/04; B29L 2009/00; B29L 2031/7418; B29L 2009/001
See application file for complete search history.

(56) References Cited

U.S. PATENT DOCUMENTS

| | | |
|---|---|---|
| 3,623,580 A | 11/1971 | Toller |
| 3,832,264 A | 8/1974 | Barnette |
| 6,604,617 B2 | 8/2003 | Davis et al. |
| 6,936,127 B2 | 8/2005 | Fenton et al. |
| 8,752,683 B2 | 6/2014 | Scicluna |
| 2015/0111623 A1 | 4/2015 | Hegemier et al. |

FOREIGN PATENT DOCUMENTS

CN    103112309 A    5/2013

OTHER PUBLICATIONS

International Search Report and the Written Opinion of the International Searching Authority from corresponding PCT/US2016/040714 dated Sep. 27, 2016.

*Primary Examiner* — Michael C Miggins
(74) *Attorney, Agent, or Firm* — Lando & Anastasi, LLP

(57) ABSTRACT

An article of luggage is provided for comprising a first layer of hard shell and a second layer of hard shell material with one or more ornamental substrate disposed between at least the first layer of hard shell material and at least the second layer of hard shell material. A section of hard shell material may be formed by pressing and/or heating at least the first layer of hard shell material, the second layer of hard shell material, and the ornamental substrate together.

31 Claims, 16 Drawing Sheets

SUITCASE MOLDING PROCESS WITH OVERLAY

RELATED APPLICATIONS

This application claims priority to U.S. Provisional Patent Application Ser. No. 62/187,622 filed on Jul. 1, 2015 and entitled Suitcase Molding Process with Overlay by Paul V. Scicluna, the disclosures of which are incorporated herein by reference.

FIELD OF THE INVENTION

The disclosed invention relates to a suitcase molding process for making hard shell luggage with textured surfaces or three-dimensional designs on surfaces of the hard shells.

BACKGROUND

Luggage may typically be divided into two categories—soft luggage, and hard shell luggage. Soft luggage is typically wrapped in a soft material, such as cloth, canvas, leather, fabric, and/or vinyl. Soft luggage is typically constructed by forming an internal frame from metal and plastic materials which may be fastened together to define an interior compartment for storing items. Padding may then be applied to the exterior and interior of the plastic and metal frame, before a soft, cloth material is applied to the exterior and interior of the luggage by stitching and/or adhering it to the luggage frame and cushioning. Soft luggage is an attractive choice for luggage designers because it allows the designer to create more intricate details and aesthetic features in the soft, cloth material, which is easily cut, stitched, and arranged to create visually appealing luggage designs. However, soft luggage is typically less durable than hard shell luggage and is subject to tearing, ripping, and staining during the normal life of the luggage.

Hard shell luggage on the other hand is formed of a hard plastic material such as polyvinyl chloride (PVC), polyethylene (PE), polypropylene (PP), carbon fiber, or Tegris®. Hard shell luggage has the advantage of resisting deformation by external forces, which affords greater protection to the contents against damage as well as preserving the overall shape and appearance of the luggage. However, hard shell luggage can be heavier than soft luggage, and designers tend to have fewer options for altering the aesthetic appearance of hard shell luggage, given the typical methods of manufacturing hard shell luggage.

Hard shell luggage may also require a more complex manufacturing process, such as injection molding or vacuum forming. These processes include the use of expensive and complex molding equipment, multiple heating and cooling steps, trimming steps, and cleaning steps to produce the luggage body. Once the front and rear hard shell components of the luggage are formed they are typically adhered to a metal frame that is placed on the center-facing edge of the hard shells. Locks, hinges, and other hardware is then connected to this metal frame. Liners and other internal components may also then be installed. This complex manufacturing process can be expensive and time consuming as compared to soft bags.

Limited options are presently available to designers for improving the overall aesthetic appearance of hard shell luggage. For example, luggage designers may seek to improve the appearance of hard shell luggage by painting patterns on the surface of the hard luggage shell. However, this method requires additional labor and time for individually painting each luggage shell. Furthermore, painting may only provide a two-dimensional design and does not provide for a textured or three-dimensional aesthetic feature. Others have sought to wrap hard shells in additional, stylized materials such as cloth or canvas. Again, however, this method requires additional materials and parts for attaching the cloth to the hard shells. Additional work is also required to secure the cloth or canvas to the hard shell. As with painting, this technique also only provides for two-dimensional design features. Finally, some designers have sought to form patterns within the hard shells themselves, by creating a unique, patterned mold for each hard shell design. However, this method requires significant startup costs associated with fabricating individualized molds for each hard shell design. These increased startup costs force designers to adopt a smaller variety of hard shell luggage designs for longer periods than they may otherwise desire, and prevents designers from easily altering the appearance of the hard luggage shell.

Items of luggage that attempt to combine certain features of hard and soft bags are described in U.S. Pat. No. 6,936,127 to Fenton et al. and U.S. Pat. No. 6,604,617 to Davis et al., the disclosures of which are incorporated in their entireties by reference herein. U.S. Pat. No. 8,752,683 to Scicluna also teaches a relatively simple and inexpensive manufacturing technique for forming hard shell luggage, the disclosures of which is incorporated in its entirety by reference herein. Nevertheless, there remains a need for a method of forming hard shells for luggage that allows luggage designers to create new, three-dimensional and/or textured designs for hard shell luggage and rapidly and inexpensively manufacture hard shell luggage using a multitude of designs and patterns.

SUMMARY OF THE INVENTION

In one exemplary embodiment, a method for producing an article of luggage may be provided, including the steps of preparing a first layer of hard shell material having a width and a length, preparing a second layer of hard shell material having a width and a length that is substantially similar to the width and the length of the first layer of hard shell material, disposing one or more ornamental substrate between at least the first layer of hard shell material and at least the second layer of hard shell material; and forming the first layer of hard shell material, the second layer of hard shell material, and the ornamental substrate into a hard luggage shell by pressing and/or heating the first layer of hard shell material, the second layer of hard shell material, and the ornamental substrate together. In some examples, the ornamental substrate is disposed between a plurality of layers of hard shell material having substantially similar widths and lengths.

In other examples the method may further include preparing a third layer of hard shell material having a width and a length that is substantially similar to the width and the length of the first layer of hard shell material, cutting openings into the third layer of the hard shell material wherein the holes substantially match the size, shape, and arrangement of the ornamental substrate. The step of forming the hard luggage shell may further comprise placing the third layer of hard shell material on top of the second layer of hard shell material, such that the holes in the third layer of hard shell material substantially align with the ornamental substrate, and pressing and/or heating the first layer of hard shell material, the second layer of hard shell material, and the ornamental substrate, and the third layer of hard shell material together.

In some implementations, the ornamental substrate is formed from plastic, metal, wood, cardboard, styrofoam, and/or foam. In other examples, the hard shell material comprises polyvinyl chloride (PVC), polyethylene (PE), polypropylene (PP), carbon fiber, and/or Tegris®.

In some examples, methods may also include removing a portion of the first, second, and third layers of hard shell material proximate the corner to define a notch, folding first and second edges of the first, second, and third layers of hard shell material to form first and second sides, the first and second sides defining second and third faces of the piece of luggage, folding third and fourth edges of the first, second, and third layers of hard shell material to form third and fourth sides, the third and fourth sides defining fourth and fifth faces of the piece of luggage; and securing a rigid corner piece to the first and second sides proximate the notch. In some examples, at least one ornamental substrate is disposed within at least one of the first, second, third, and/or fourth sides of the first, second, and third layers of hard shell material.

Other examples of the present disclosure include an article of luggage comprising a front hard shell section and a rear hard shell section, each of the front hard shell section and the rear hard shell section including, a first layer of hard shell material having a width and a length, a second layer of hard shell material having a width and a length that is substantially similar to the width and the length of the first layer of hard shell material, one or more ornamental substrate disposed between at least the first layer of hard shell material and at least the second layer of hard shell material, and wherein at least the first layer of hard shell material, the second layer of hard shell material, and the ornamental substrate comprise a hard shell section formed by pressing and/or heating at least the first layer of hard shell material, the second layer of hard shell material, and the ornamental substrate together. In some examples, the ornamental substrate is disposed between a plurality of layers of hard shell material having substantially similar widths and lengths.

In some examples, the luggage article may also include a third layer of hard shell material having a width and a length that is substantially similar to the width and the length of the first layer of hard shell material, the third layer of the hard shell material having holes that substantially match the size, shape, and arrangement of the ornamental substrate, and the third layer of hard shell material is disposed on top of the second layer of hard shell material, such that the holes in the third layer of hard shell material align with the ornamental substrate whereby at least a portion of the ornamental substrate protrudes through the holes.

In some examples, the ornamental substrate is formed from plastic, metal, wood, cardboard, and/or foam. In other examples, the hard shell material comprises polyvinyl chloride (PVC), polyethylene (PE), polypropylene (PP), carbon fiber, and/or Tegris®. In some implementations, the first, second, and third layers of hard shell material have at least one corner wherein a portion of the hard shell material been removed forming at least one notch proximate the at least one corner, wherein first and second edges of the at least one section adjacent the notch are folded inward relative an inner surface of the at least one section forming first and second sides, the first and second sides defining second and third faces of the article of luggage, and at least one rigid corner piece secured to the first and second sides proximate the at least one notch, and the third and fourth edges of the first, second, and third layers of hard shell material adjacent a second notch are folded inward relative the inner surface forming third and fourth sides, the third and fourth sides defining fourth and fifth faces of the luggage article.

BRIEF DESCRIPTION OF THE DRAWINGS

Various aspects of at least one embodiment are discussed below with reference to the accompanying figures. The figures are provided for the purposes of illustration and explanation and are not intended as a definition of the limits of the invention. In the figures.

LIST OF REFERENCE NUMERALS UTILIZED IN THE DRAWINGS

Figure 1:
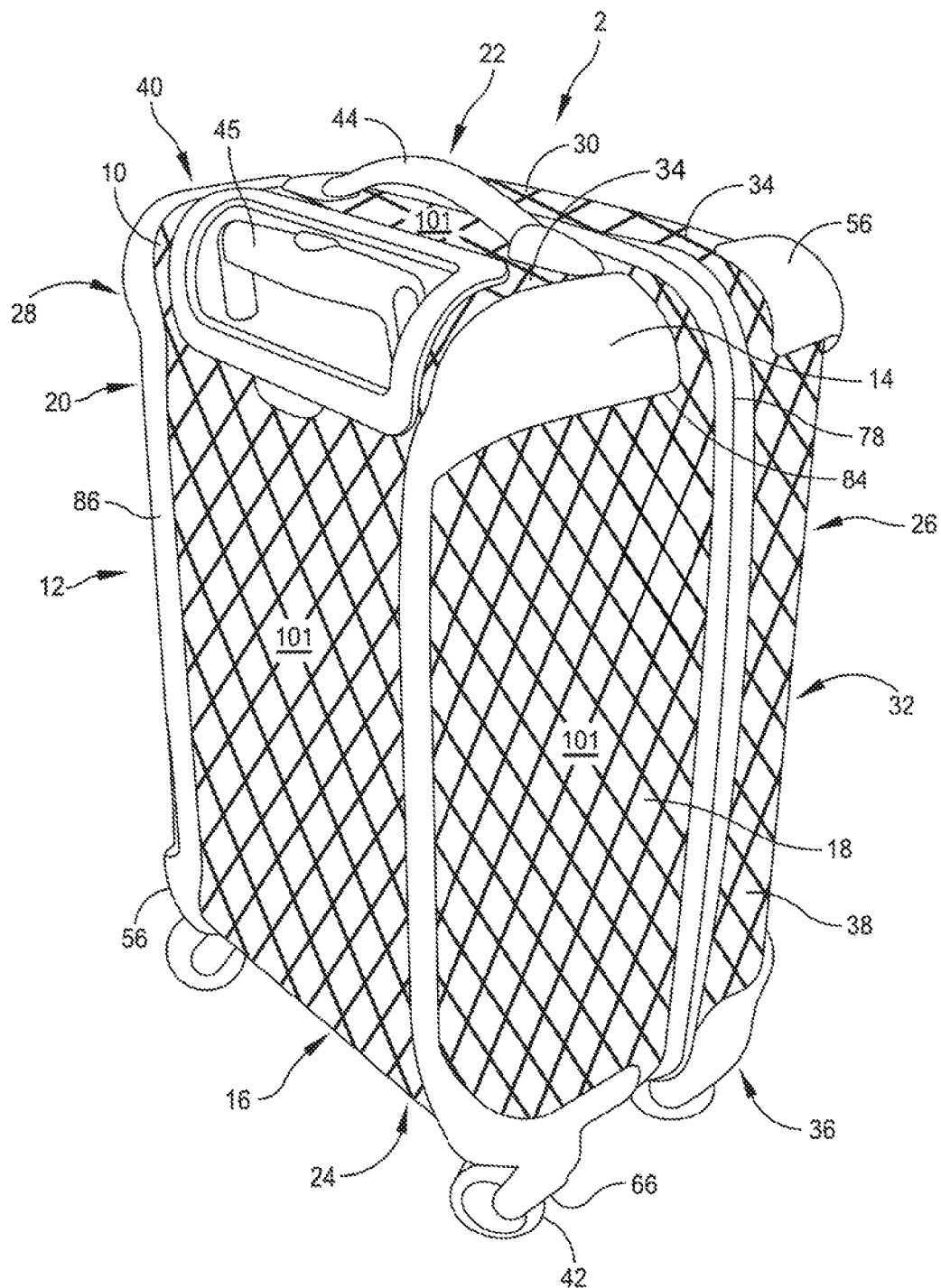
FIG. 1 is a three-quarter back perspective view of a first exemplary embodiment of a piece of luggage according to the disclosed subject matter.
Figure 2:
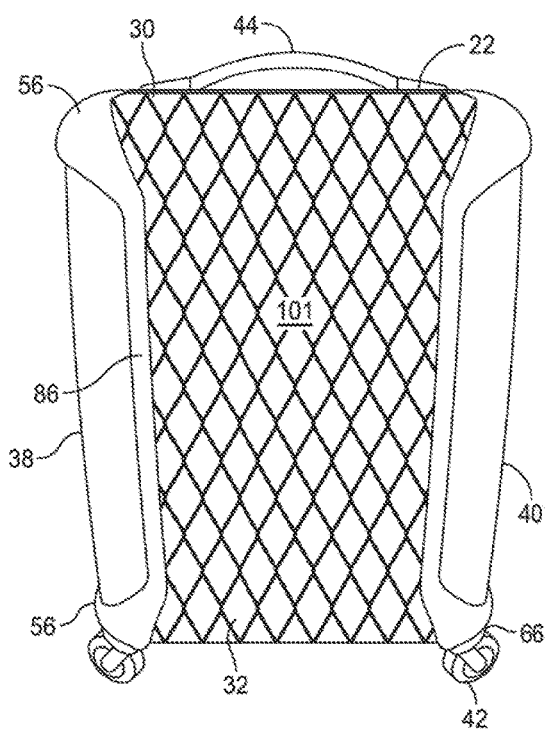
FIG. 2 is a front view of the piece of luggage of FIG. 1.
Figure 3:
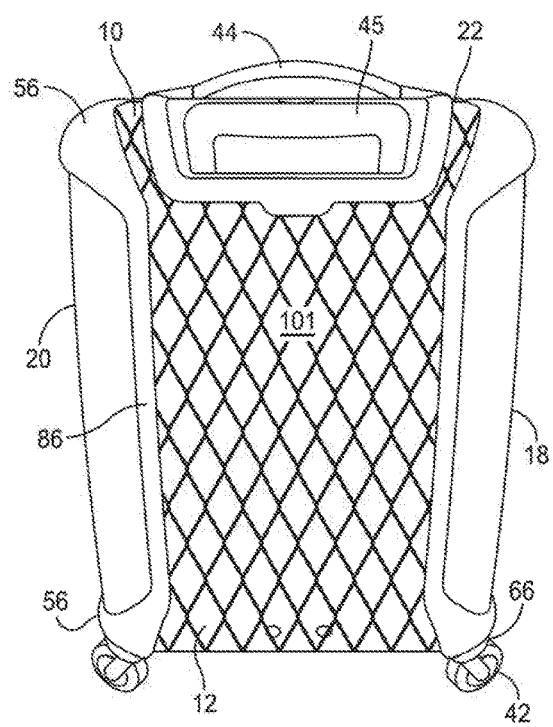
FIG. 3 is a back view of the piece of luggage of FIG. 1.

With regard to reference numerals used, the following numbering is used throughout the description and drawings. Where technical features in the figures or detailed description are followed by these reference numerals, the reference numerals have been included for the sole purpose of increasing the intelligibility of the figures or detailed description. Accordingly, neither the reference numerals nor their absence are intended to have any limiting effect on the scope of any claim elements. In the figures, each identical or nearly identical component that is illustrated in various figures is represented by a like numeral. For purposes of clarity, not every component may be labeled in every figure.

Reference numeral 2 refers to a piece of luggage.
Reference numeral 10 refers to a rear shell section of luggage.
Reference numeral 12 refers to a rear face of luggage.
Reference numeral 14 refers to a side panel of luggage.
Reference numeral 16 refers to a side panel of luggage.
Reference numeral 18 refers to a side panel of luggage.
Reference numeral 20 refers to a side panel of luggage.
Reference numeral 22 refers to a top side of luggage.
Reference numeral 24 refers to a bottom side of luggage.
Reference numeral 26 refers to a left side of luggage.
Reference numeral 28 refers to a right side of luggage.
Reference numeral 30 refers to a front shell section of luggage.
Reference numeral 32 refers to a front face of luggage.
Reference numeral 34 refers to a side panel of luggage.
Reference numeral 36 refers to a side panel of luggage.
Reference numeral 38 refers to a side panel of luggage.
Reference numeral 40 refers to a side panel of luggage.
Reference numeral 42 refers to luggage wheels.
Reference numeral 44 refers to a handle.
Reference numeral 45 refers to an extendable handle.
Reference numeral 46 refers to a corner of a layer of stiff shell material.
Reference numeral 48 refers to a notch in a layer of stiff shell material.
Reference numeral 50 refers to an edge of a layer of stiff shell material.
Reference numeral 52 refers to an edge of a layer of stiff shell material.
Reference numeral 54 refers to an inner surface of a layer of stiff shell material.
Reference numeral 56 refers to a rigid corner piece for luggage.
Reference numeral 58 refers to holes.
Reference numeral 60 refers to an edge of a layer of stiff shell material.
Reference numeral 62 refers to an edge of a layer of stiff shell material.
Reference numeral 66 refers to an edge of a layer of stiff shell material.
Reference numeral 68 refers to an edge of a layer of stiff shell material.
Reference numeral 70 refers to an edge of a layer of stiff shell material.
Reference numeral 72 refers to an edge of a layer of stiff shell material.
Reference numeral 74 refers to an inner surface of a layer of stiff shell material.
Reference numeral 76 refers to a gusset.
Reference numeral 78 refers to a zipper.
Reference numeral 84 refers to an outer surface.
Reference numeral 86 refers to support structures.
Reference numeral 88 refers to a notch in a layer of stiff shell material having a semi-circular shape.
Reference numeral 90 refers to an edge of a layer of stiff shell material.
Reference numeral 92 refers to an edge of a layer of stiff shell material.
Reference numeral 94 refers to a surface coating.
Reference numeral 96 refers to layers of stiff shell material.
Reference numeral 98 refers to an inner fastening piece.
Reference numeral 101 refers to surface ornamentation.
Reference numeral 103 refers to an ornamental substrate.
Reference numeral 105 refers to a first layer of stiff shell material.
Reference numeral 107 refers to a second layer stiff shell material.
Reference numeral 109 refers to a third layer of stiff shell material.
Reference numeral 111 refers to a plurality of openings in a layer of stiff shell material.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

As disclosed herein, the devices and methods presented can be used for lightweight, high-strength luggage with a multitude of patterns and designs appearing on the exterior of the body of the luggage.

For the purpose of explanation and illustration, and not limitation, an example of a suitcase is shown in FIGS. 1-6. As illustrated, the suitcase shown in FIGS. 1-6 can be of any suitable specific construction in terms of materials, manner of assembly, and configurations of the parts. The suitcase 2, as shown in FIGS. 1-5, includes a rear section 10 and/or front section 30 made of a stiff shell material, such as a woven polypropylene (PP) thermoplastic composite having characteristics described herein below, such as polyvinyl chloride (PVC), polyethylene (PE), polypropylene (PP), carbon fiber, or Tegris® polypropylene moldable fabric manufactured by Milliken (available at http://www.milliken.com/MFT); however, a person having ordinary skill in the art will recognize that any suitable fabric, plastic, metal, or any other suitable material having a high stiffness-to-weight ratio and high impact resistance can be used.

The rear section 10 can have a substantially rigid main panel defining a rear face 12 of the luggage 2, and side panels 14, 16, 18, 20, which can partially define top 22, bottom 24, left side 26, and right side 28 faces of the luggage 2. The luggage 2 can also have a front shell section 30 has a substantially rigid main panel, defining a front face 32 of the luggage, and side panels 34, 36, 38, 40, which can further define the top 22, bottom, 24, left side 26, and right side 28 faces of the luggage 2.

In some embodiments, front shell section 30, rear shell section 10, top face 22, bottom face 24, left side face 26, and right side face 28 of luggage 2 may also include surface ornamentation 101. Surface ornamentation 101 may comprise any three-dimensional, raised, and/or textured pattern or design suitable for placement on a luggage item. As shown in FIGS. 1-6, for example and without limitation, surface ornamentation may take the form of a chain-link or grid pattern in some embodiments. However, as discussed in greater detail below, surface ornamentation 101 may take any form selected by the designer, including any shapes, lines, patterns, or raised surfaces. In some embodiments, surface ornamentation 101 may be located on one or more of front shell section 30, rear shell section 10, top face 22, bottom face 24, left side face 26, and right side face 28. In other embodiments, surface ornamentation 101 may have a substantially uniform pattern and/or appearance on each of front shell section 30, rear shell section 10, top face 22, bottom face 24, left side face 26, and right side face 28.

FIGS. 7-10, the rear and front sections 10 and 30 of luggage 2 can be provided as sheets of the stiff shell material. In some embodiments, the rear section 10 has a corner 46 in which a portion has been removed defining a notch 48. In forming the luggage 2, edges 50, 52 of the rear section 10 adjacent the notch 48 are folded inward relative inner surface 54 forming sides 14, 18, which are shown in FIG. 1, for example and without limitation. As shown in FIG. 1, for example and without limitation, sides 14, 18 define the rear section 10 portions of the top and left faces 22, 26 of the luggage 2. Sides 14 and 18 can abut proximate edges 90 and 92 of rear section 10 and further can be stitched, or otherwise joined, proximate the edges 90, 92. Further, sides 14 and 18 can partially overlap when secured together proximate edges 90, 92, and an additional piece of the stiff shell material can be cut to fit and be secured about the joined edges 90, 92 for additional reinforcement.

Figure 9:
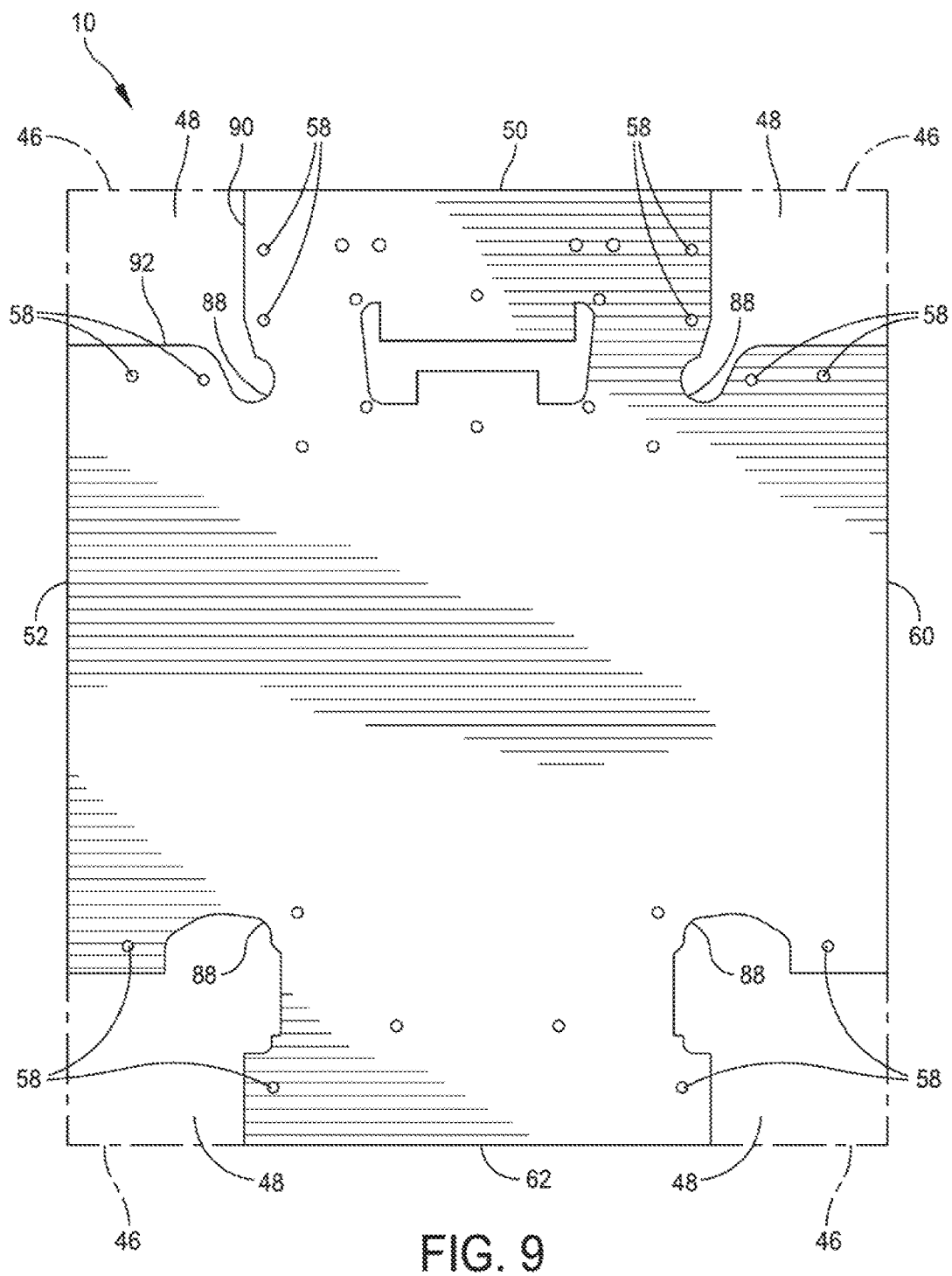
FIG. 9 is a plan view of a first section of the stiff shell material according to a second exemplary embodiment of the disclosed subject matter.
Figure 10:
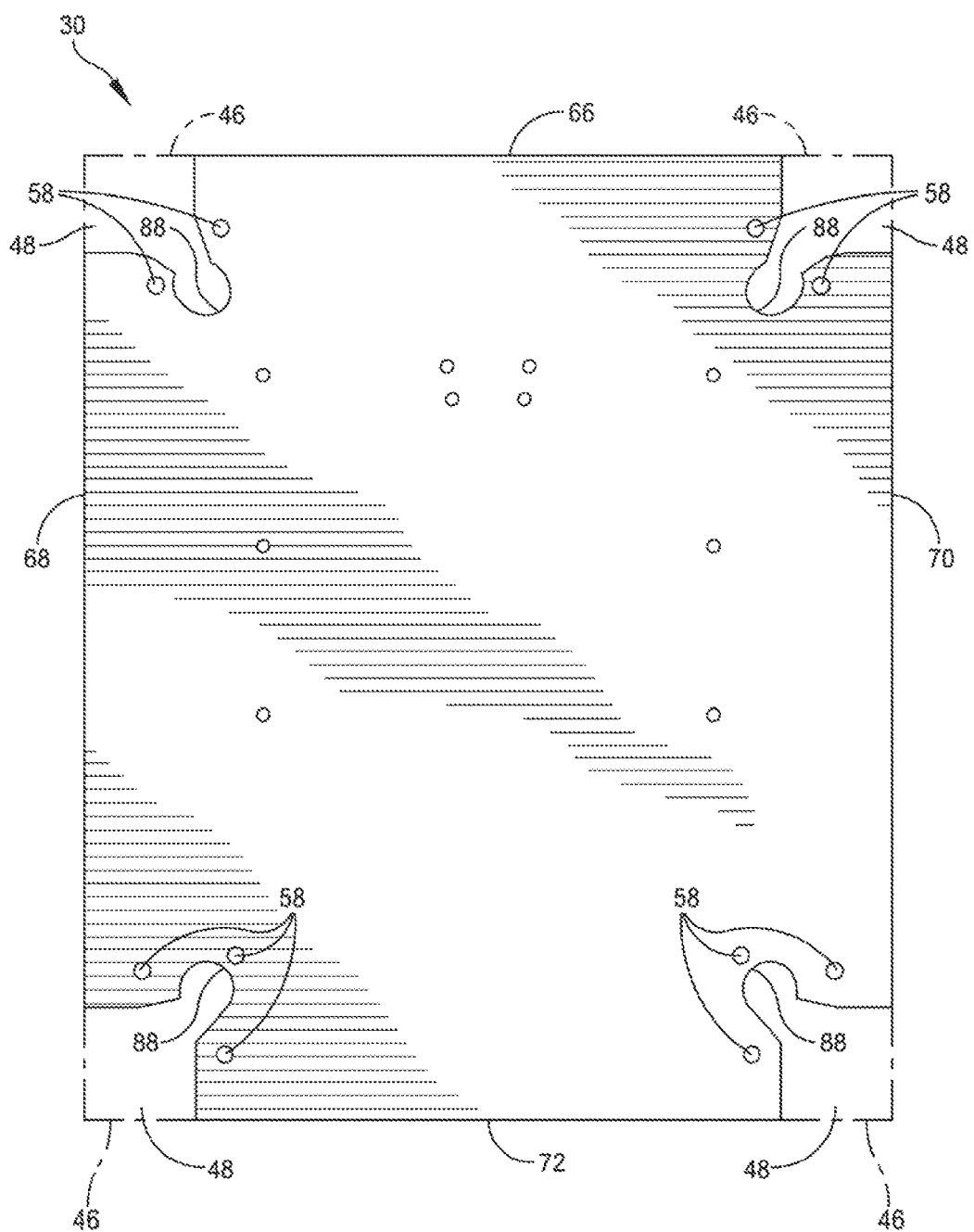
FIG. 10 is a plan view of a second section of the stiff shell material according to the second exemplary embodiment of the disclosed subject matter.
Figure 11:
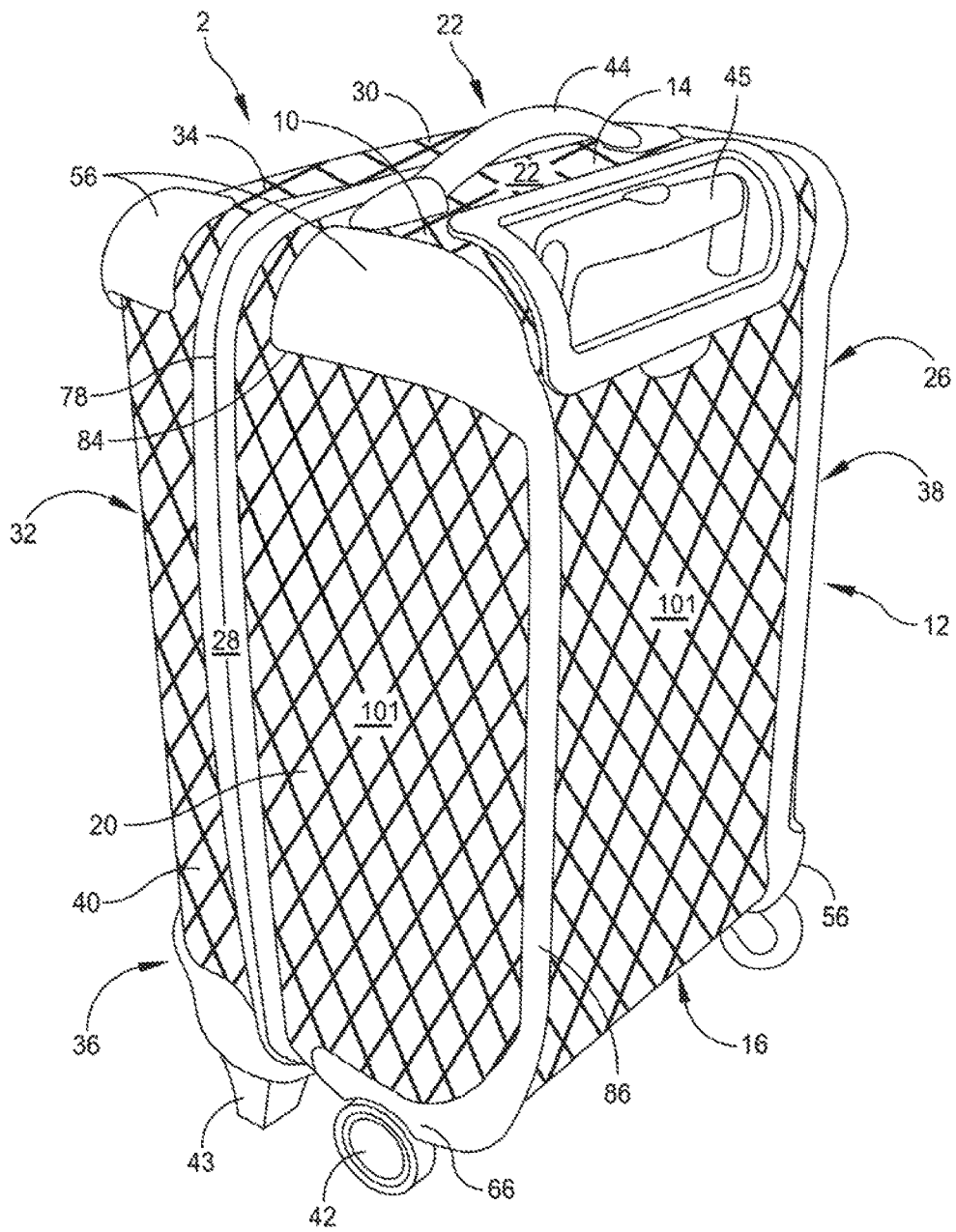
FIG. 11 is a three-quarter back perspective view of a second exemplary embodiment of a piece of luggage according to the disclosed subject matter.

The shape of the notches 48 can vary depending on the desired characteristics of the luggage 2. For example and without limitation, the notches 48 can have the edges 90 and 92 be substantially perpendicular (as shown in FIGS. 7-10, for example and without limitation). Additionally or alternatively, the notches 48 can include a portion having a semicircular shape 88, and the semicircular shape 88 can be towards the interior of the sheet, furthest away from the respective corner 46. The shape of the notches 48 can differ, for example, to accommodate additional or fewer wheels 42. The semicircular shape 88 can, for example, aid in mating sides 14 and 18 to the rigid corner piece 56. For example and without limitation, it is contemplated that the luggage 2 can accommodate four wheels (as shown in FIG. 1) or two wheels (as shown in FIG. 11). Alternatively, some of the notches 48 can have portions that are U-shaped, V-shaped, W-shaped, or any other suitable shape.

The shape of the notches 48, holes 58, and any other features of the rear section 10 and/or front section 30 can be formed by cutting, drilling, etching, trimming, or any other suitable method for removing portions of a sheet of material described herein. The preparation of the rear section 10 and the front section 30 of the stiff shell material in this manner can eliminate the need for expensive molding processes, such as those required with traditional manufacturing methods, yet can provide shell sections 10, 30 that have high stiffness-to-weight ratio and high impact resistance.

In other embodiments, the sheets of stiff shell material may be formed into hard luggage shells without pre-cutting notch 48 or joining edges 90 and 92 and hard luggage shells may be formed using sheets of polyvinyl chloride (PVC), polyethylene (PE), polypropylene (PP), carbon fiber, or Tegris® without internal cutting. In such embodiments, excess hard shell material may need to be trimmed from the corners of the hard luggage shells after they are formed and additional holes may need to be cut for hardware such as handles and/or wheels, as is known to one of ordinary skill in the art, after the hard luggage shells are formed.

Figure 8:
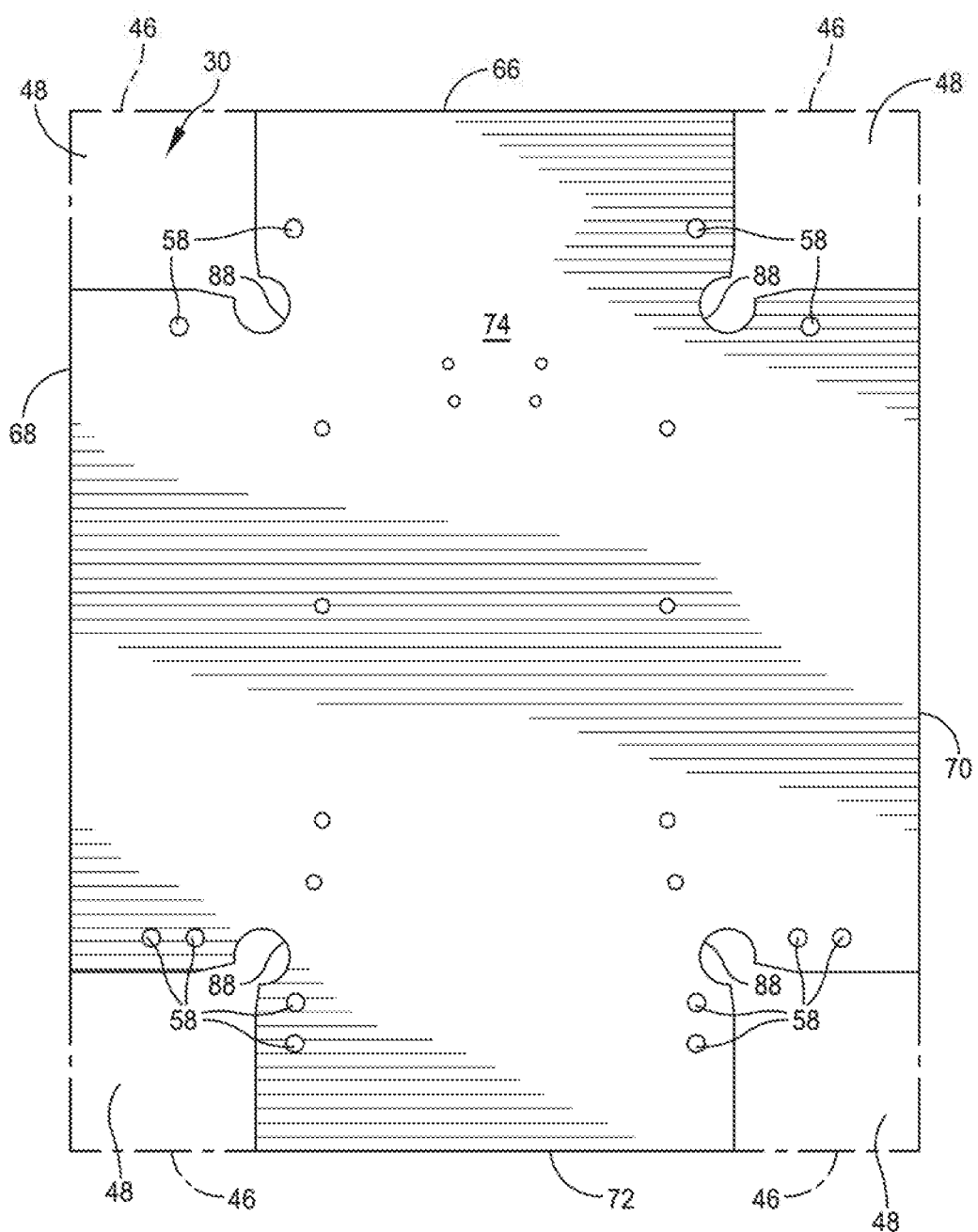
FIG. 8 is a plan view of a second section of the stiff shell material according to the first exemplary embodiment of disclosed subject matter.

In an exemplary embodiment, luggage 2 can have a front section 30 that defines the front face 32 of the luggage 2 (as shown in FIG. 1, for example and without limitation). As shown in FIG. 8, for example and without limitation, front section 30 can have four edges 66, 68, 70, 72. The four edges 66, 68, 70, 72 of front section 30 can be folded inward relative an inner surface 74 of the front section 30 to form four sides 34, 36, 38, 40, as best shown in FIG. 1, for example and without limitation. Any of the adjacent sides 34, 36, 38, 40 can be secured to a rigid corner piece 56 in any manner described above. The four sides 34, 36, 38, 40 of the front section 30 can each further be securable to a respective one of the four sides 14, 16, 18, 20 of the rear section 10. In this manner, the four sides 34, 36, 38, 40 further define the top 22, bottom, 24, left 26, and right 28 sides of the luggage 2.

The rear and front sections 10 and 30 of luggage 2 may be formed by pressing the sheets under heat to form hard luggage shells. Under heat and pressure, the sheets of stiff shell material partially melt, becoming formable until cooled. In some embodiments, the stiff shell material may be pressed and heated against a form with a desired overall shape for the hard luggage shells. In other embodiments, the sheets of stiff shell material may be vacuum formed to make hard luggage shells. In some embodiments, forming a hard luggage shell in this manner results in a hard luggage shell that may have a thickness of just 0.005 inch (0.13 mm) and weighing just 0.02 lbs/sq. ft. However, sheets of stiff shell material may also be available in 0.125 inch, 0.250 inch and 0.500 inch thick sizes. Therefore, depending on the thickness of the sheets of hard shell material, multiple layers of hard shell material may need to be pressed and formed to achieve the required thickness.

Figure 12:
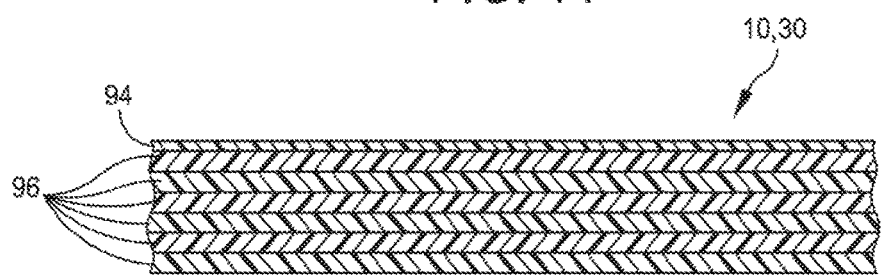
FIG. 12 is a cross section of a section of stiff shell material according to an exemplary embodiment of the disclosed subject matter.

As shown in FIG. 12, for example and without limitation, rear section 10 and/or front section 30 of the stiff shell material can have a plurality of layers. For example and without limitation, it is contemplated that a single sheet of the shell material of rear section 10 and/or front section 30 can have six layers 96 of woven polypropylene (PP) thermoplastic composite. However, any suitable number of layers of woven polypropylene (PP) thermoplastic composite, or other suitable material, can be used. Additionally, rear section 10 and/or front section 30 of the stiff shell material can have a surface coating 94, for example and without limitation, to enhance cosmetic effects, such as scratch resistance or to alter the color of the underlying material. For example and without limitation, the surface coating 94 can be a polyester film, such as polyethylene terephthalate (PET), or any other suitable material. The use of the shell material, such as woven polypropylene (PP) thermoplastic composite, for rear section 10 and front section 30 can produce sections that are bendable, yet have memory to prevent permanent deformities due to impacts. Additionally, the sheets of shell material can be stitched for added versatility.

Figure 13:
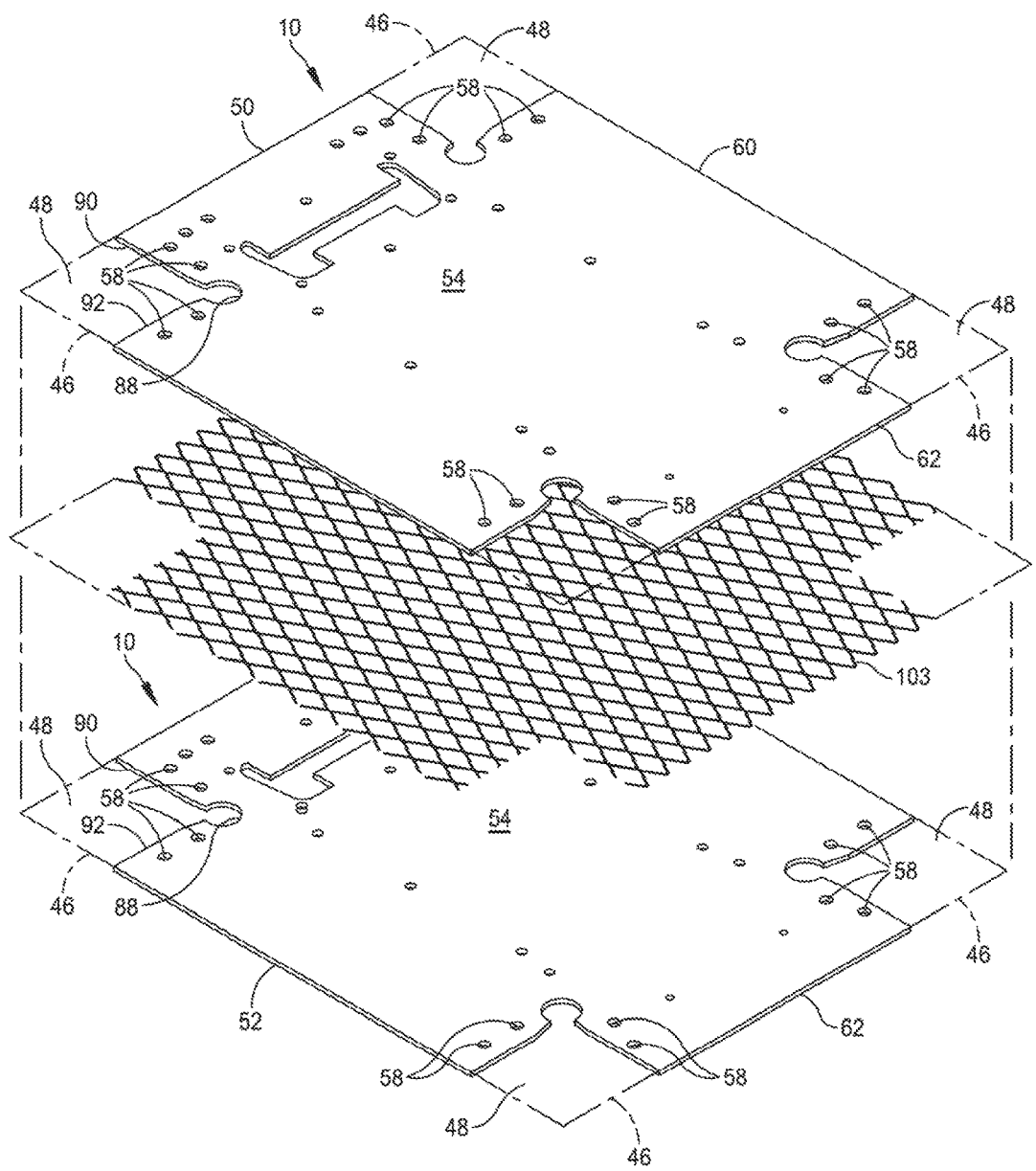
FIG. 13 is an exploded perspective view of an ornamental substrate in the form of a grid between two layers of stiff shell material according to an exemplary embodiment of the disclosed subject matter.
Figure 14:
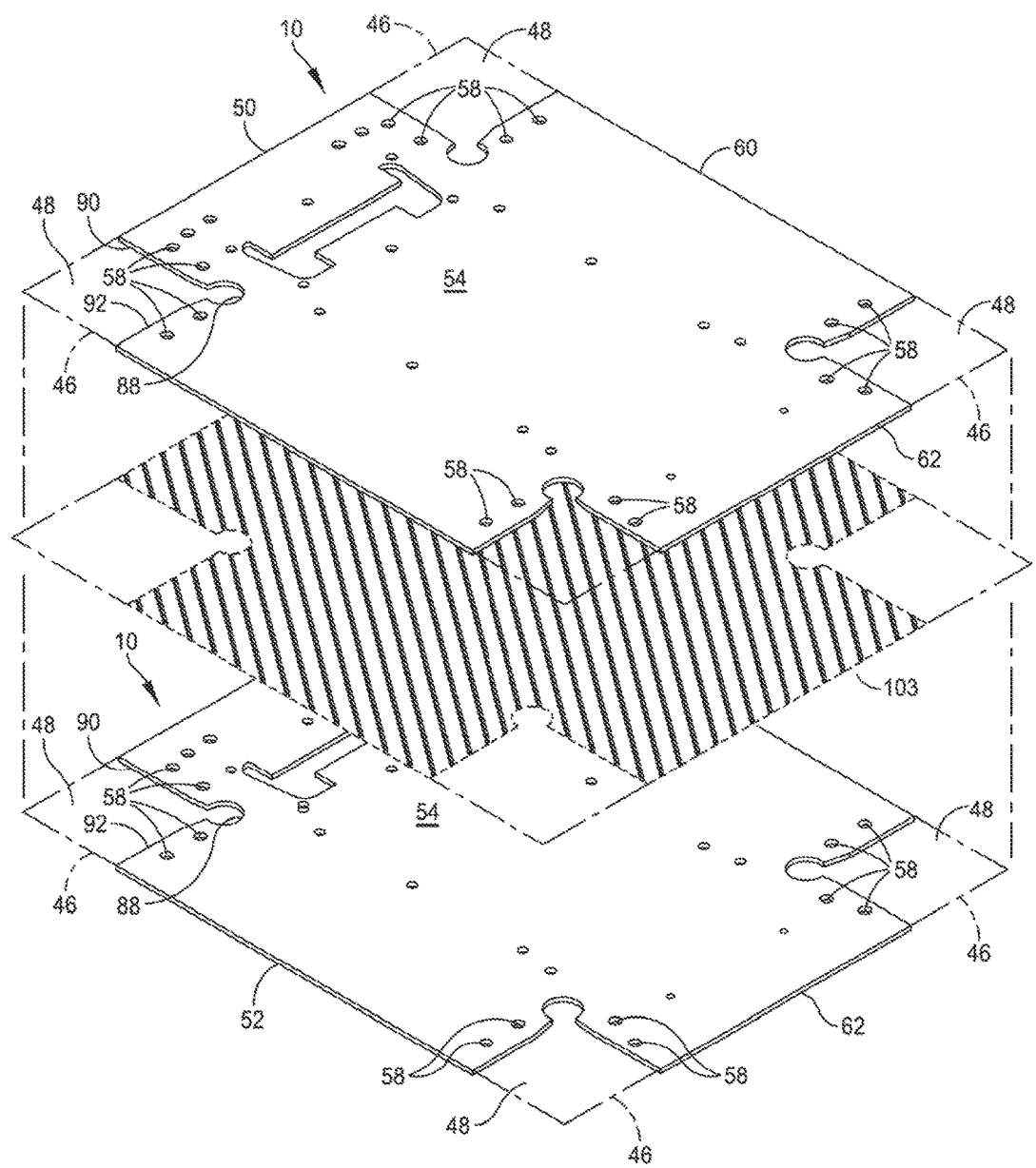
FIG. 14 is an exploded perspective view of an ornamental substrate in the form of parallel lines between two layers of stiff shell material according to an exemplary embodiment of the disclosed subject matter.
Figure 15:
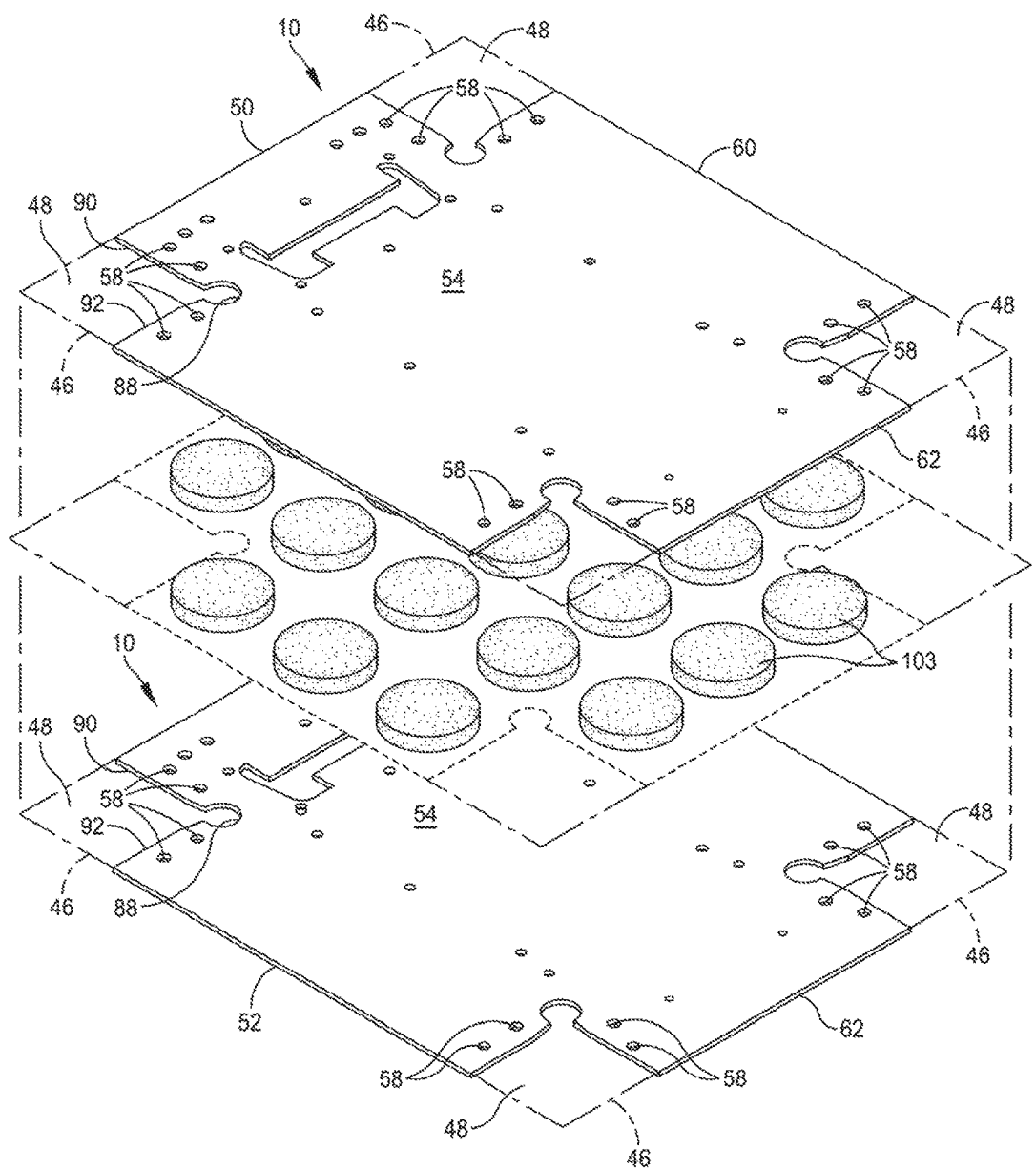
FIG. 15 is an exploded perspective view of an ornamental substrate in the form of dots between two layers of stiff shell material according to an exemplary embodiment of the disclosed subject matter.
Figure 16:
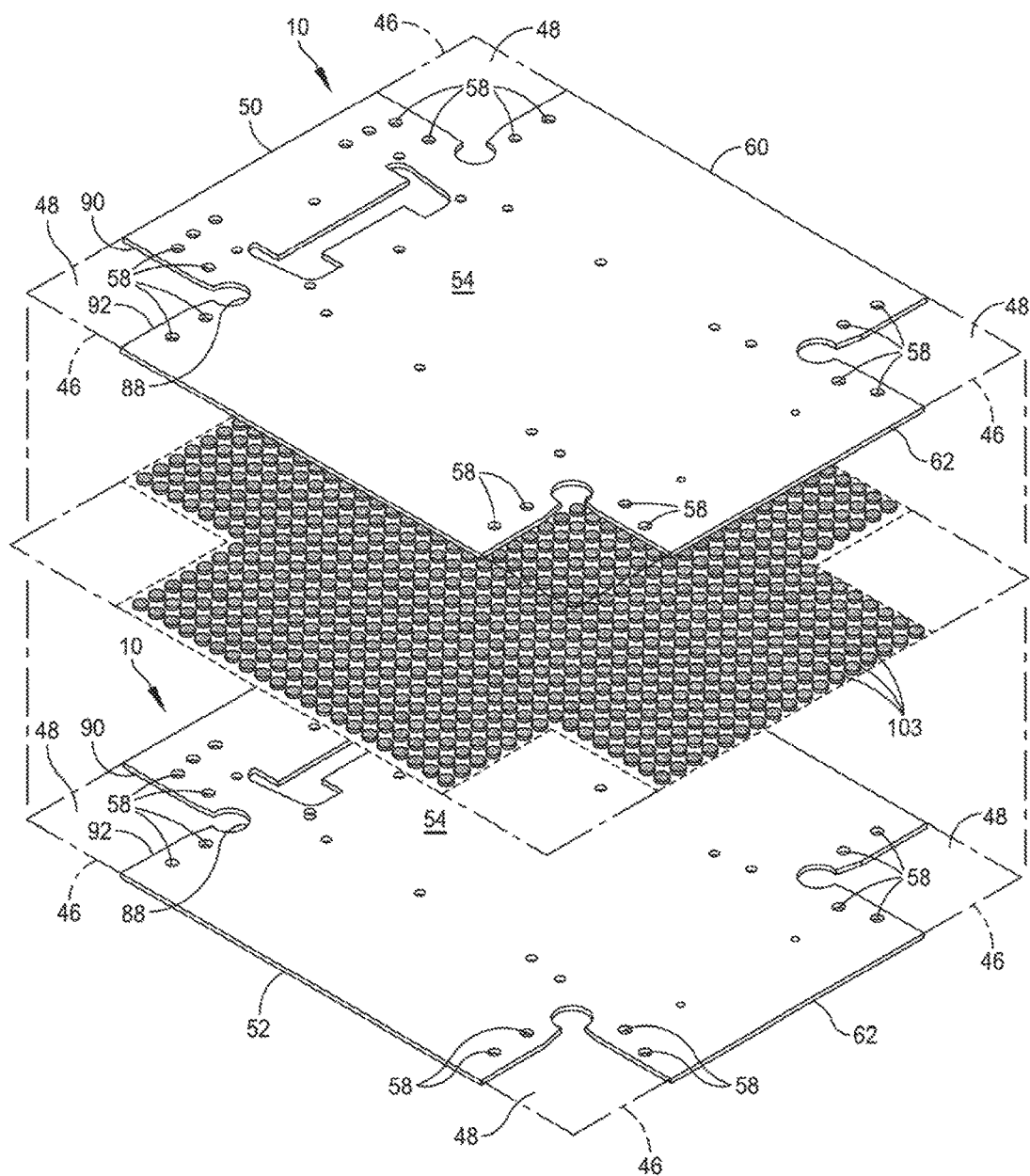
FIG. 16 is an exploded perspective view of an ornamental substrate in the form of a textured surface between two layers of stiff shell material according to an exemplary embodiment of the disclosed subject matter.
Figure 17:
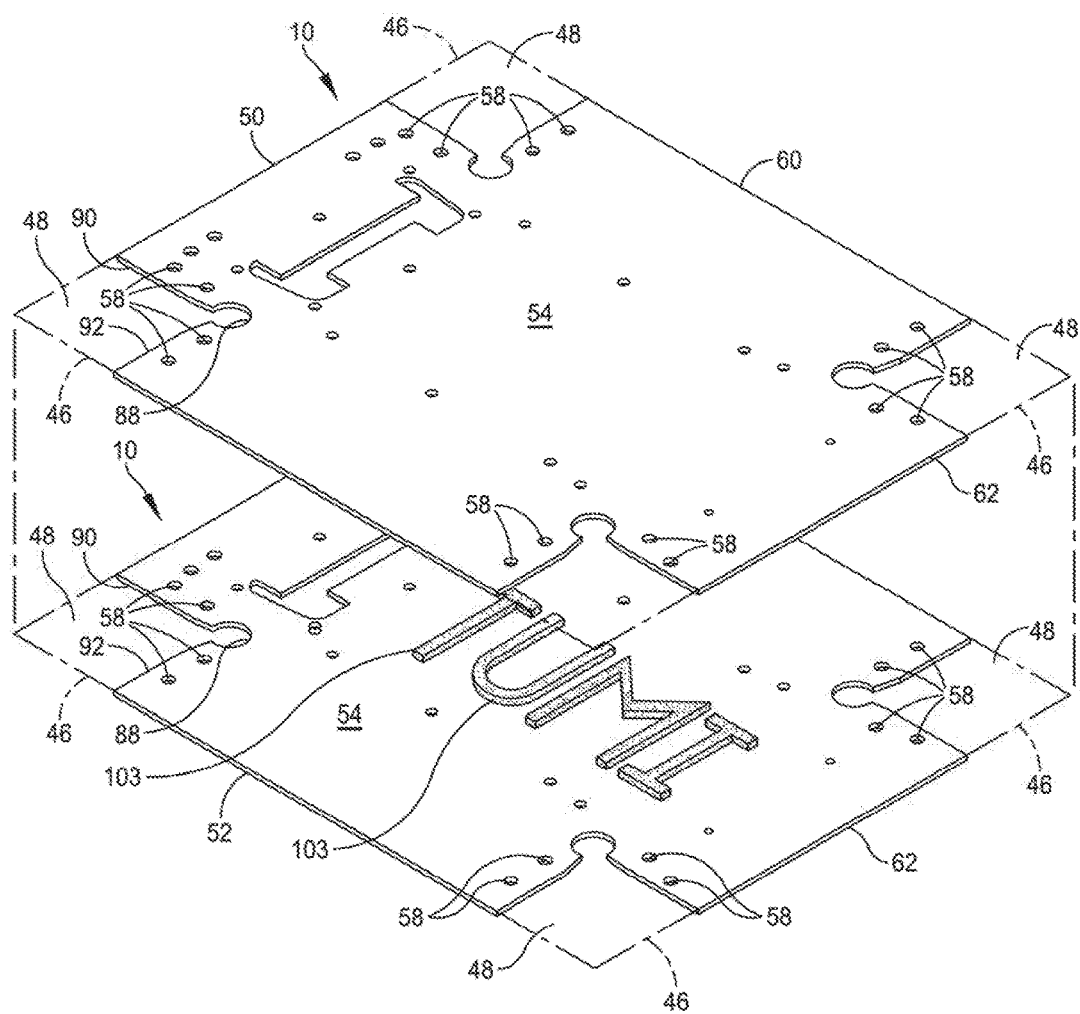
FIG. 17 is an exploded perspective view of an ornamental substrate in the form of a logo between two layers of stiff shell material according to an exemplary embodiment of the disclosed subject matter.
Figure 18:
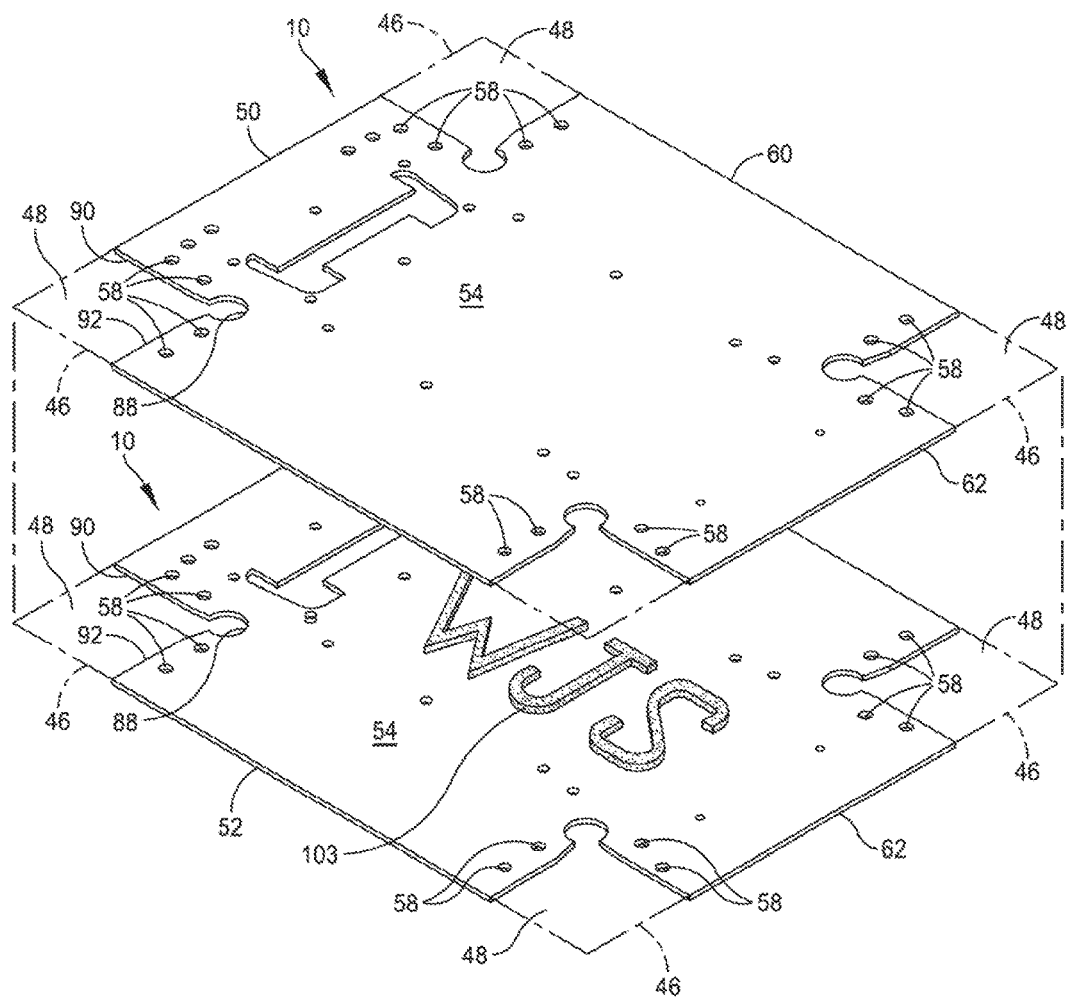
FIG. 18 is an exploded perspective view of an ornamental substrate in the form of a monogram between two layers of stiff shell material according to an exemplary embodiment of the disclosed subject matter.

In some embodiments, it may be desirable to form hard luggage shells having a surface ornamentation 101, as shows, for example, in FIGS. 1-4 and 12. As shown, for example, in FIGS. 13-18, the hard luggage shell forming process further may include disposing an ornamental substrate 103 between two or more layers of stiff shell material before heating and pressing the material to form a hard luggage shell. Ornamental substrate 103 may be formed of any suitable material for mass-producing three-dimensional patterns and which will maintain its intended shape during the hard luggage shell forming process. Suitable materials for ornamental substrate 103 include, but are not limited to, wood, rubber, plastic, cardboard, paper, metals, styrofoam and/or foam or any other suitable substrate-forming material, as is known to those of ordinary skill in the art. In some embodiments, ornamental substrate 103 may take the form of a grid or chain-link pattern, as shown, for example, in FIG. 13. However, ornamental substrate 103 may be formed into any desired shape, texture, and/or three dimensional pattern desired by a designer of hard shell luggage. For example, ornamental substrate 103 may comprise a collection of raised lines (FIG. 14), a set of dots (FIG. 15), a textured surface (FIG. 16), a company logo (FIG. 17), and/or a monogram (FIG. 18).

As shown, for example, in FIGS. 1-4 and 12-18, surface ornamentation 101 may be presented on any surface of a hard luggage shell, including front shell section 30, rear shell section 10, top face 22, bottom face 24, left side face 26, and/or right side face 28 of luggage 2, by placing one or more ornamental substrate 103 within or on top of a desired section of stiff shell material prior to heating and pressing. For example, surface ornamentation 101 may be presented within front shell 30 by disposing one or more ornamental substrate 103 on top of the hard shell material used to form front shell 30. More specifically, surface ornamentation 101 may be presented on side 40 by disposing one or more ornamental substrate 103 on top of the hard shell material used to form front shell 30 proximal to edge 68. Similarly, surface ornamentation 101 may be presented on side 38, by disposing one or more ornamental substrate 103 on top of the hard shell material used to form front shell 30 proximal to edge 70. In this same manner, surface ornamentation 101 may be presented on any side of luggage 2, by disposing one or more ornamental substrate 103 on top of the hard shell material used to form front shell section 30 or rear shell section 10, proximal to any of edges 66, 68, 70, 72 of front shell section 30 or proximal to edges 50, 52, 60, 62 of rear shell section 10.

Figure 19:
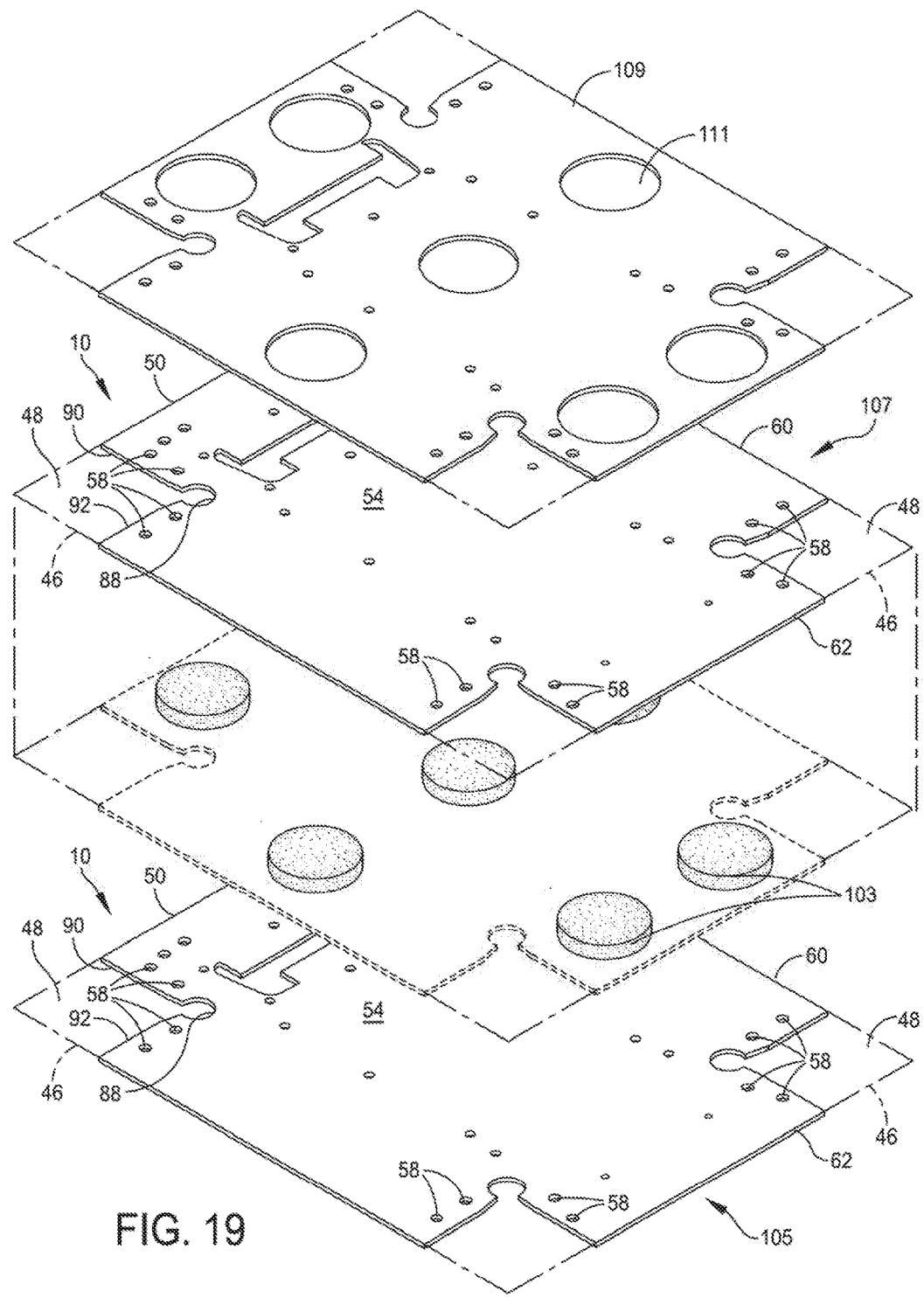
FIG. 19 is an exploded perspective view of an ornamental substrate between a first and second layer of stiff shell material and a third layer of stiff shell material with holes corresponding to the ornamental substrate according to an exemplary embodiment of the disclosed subject matter.

In other embodiments, an ornamental substrate 103 may be placed between a plurality of layers of stiff shell material in order to create a multi-layered aesthetic effect. As shown, for example, in FIG. 19, one or more ornamental substrate 103 may be disposed between a first layer of stiff shell material 105, and a second layer stiff shell material 107 having a first color, so as to create surface ornamentation on a hard luggage shell having a first color. Alternatively, a third layer of stiff shell material 109 having a second color may be heated and pressed on top of the second layer of stiff shell material 107. In some embodiments, the third layer of stiff shell material 109 may have a plurality of cutouts or openings 111 corresponding to the shape and location of the one or more substrate 103, as shown for example in FIG. 19. In this manner, surface ornamentation 101 may be presented on a hard luggage with a first color, whereas the surrounding stiff shell material has a contrasting second color.

Figure 20:
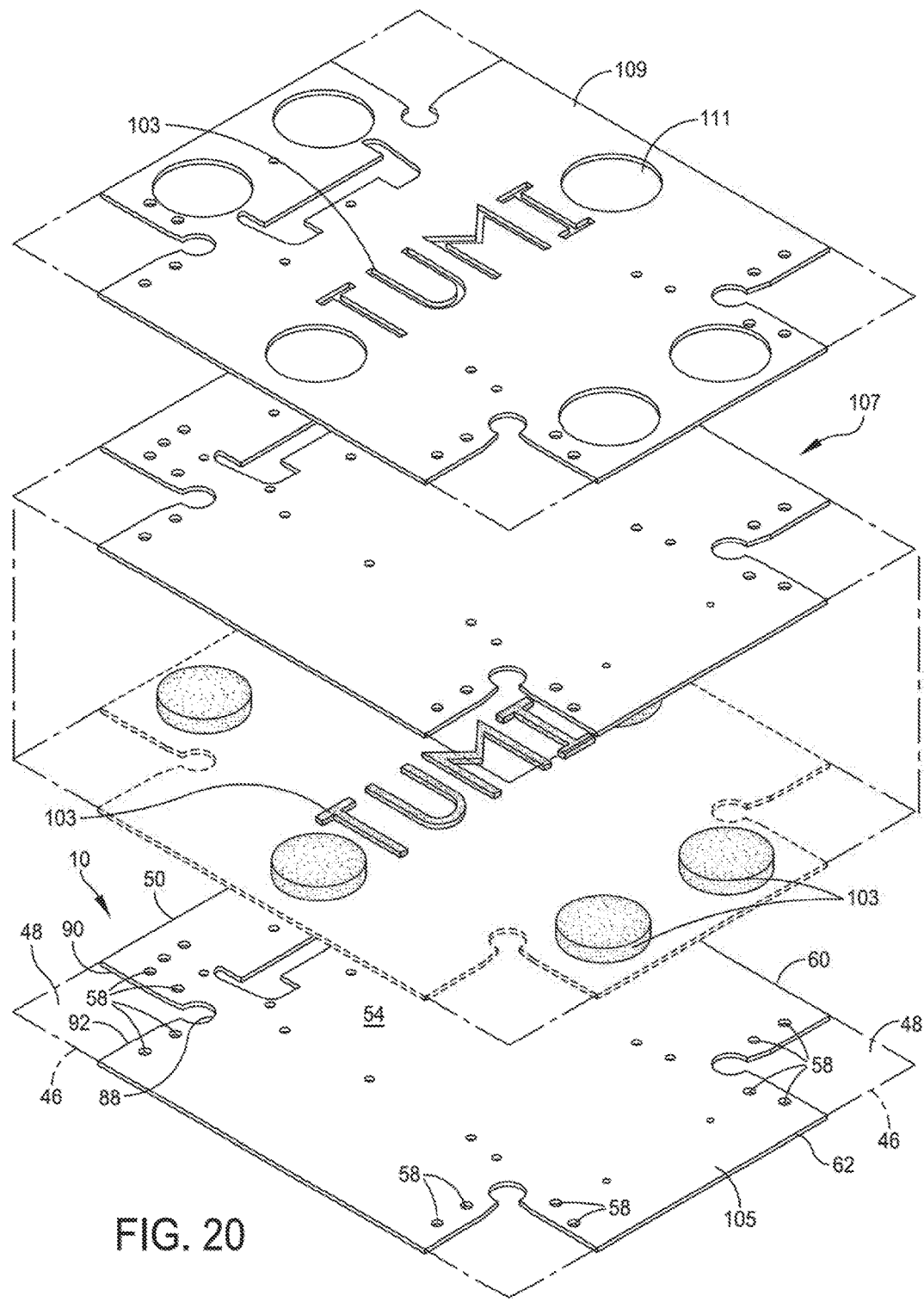
FIG. 20 is an exploded perspective view of an ornamental substrate in the form of both a logo and dots between a first and second layer of stiff shell material and a third layer of stiff shell material with holes corresponding to the ornamental substrate according to an exemplary embodiment of the disclosed subject matter.

In further embodiments, ornamental substrate 103 of differing shapes and sizes may be employed in combination to achieve a desired design or effect. As shown, for example, in FIG. 20, ornamental substrate 103 comprising a dot pattern may be used in combination with ornamental substrate 103 comprising a logo, for example. Such arrangements of ornamental substrate 103 may be disposed between a plurality of layers of hard shell material so as to meet the needs of the designer. There are no limits on the design and arrangement of ornamental substrate 103 that may be used to create three-dimensional and/or textured effects on hard shell luggage according to the present invention.

Figure 6:
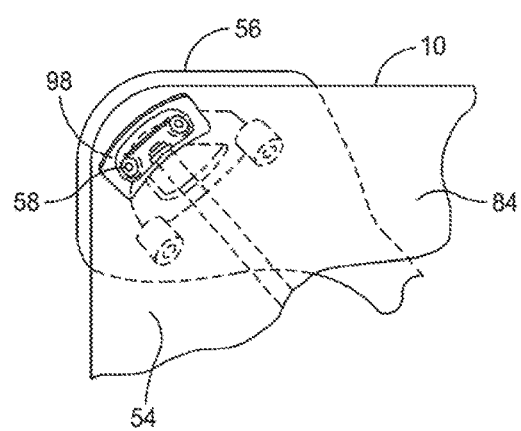
FIG. 6 is a cut-away view of an interior portion of the piece of luggage showing an inner fastening piece secured to a rigid corner piece according to an exemplary embodiment of the disclosed subject matter.
Figure 7:
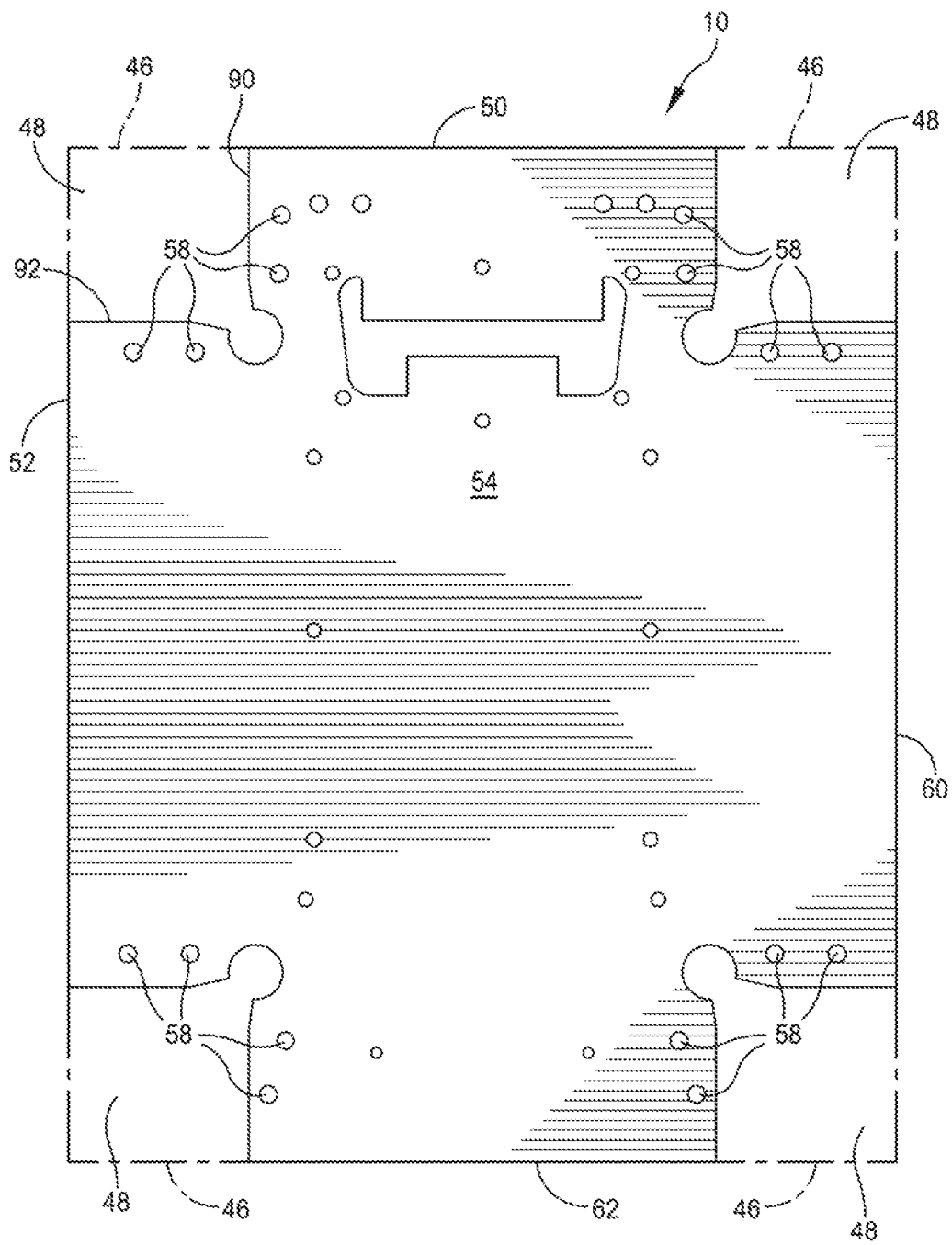
FIG. 7 is a plan view of a first section of the stiff shell material according to the first exemplary embodiment of the disclosed subject matter.

Once the hard luggage shells are formed by pressing and heating, for example, the sides 14 and 18 of the rear section 10 may be secured to a rigid corner piece 56. The sides 14, 18 can be secured by attaching fasteners to the rigid corner piece 56 through one or more of the holes 58 (as shown in FIG. 7, for example and without limitation) in the rear section 10 adjacent the notch 48. Alternatively, the sides 14, 18 can be secured to the rigid corner piece 56 by pins, staples, glue, rivets, or any other suitable fastening mechanism. The rigid corner piece 56 can be secured to the inner surface 54 of the rear section 10, or alternatively, the rigid corner piece 56 can be secured to an outer surface 84 of the rear section 10. Additionally or alternatively, the rigid corner piece 56 can be secured to an inner fastening piece 98 disposed on the inner surface 54, with rear section 10 disposed between the rigid corner piece 56 and the inner fastening piece 98 (as shown in FIG. 6, for example and without limitation). Further, rigid corner piece 56 can be secured to rear face 12 by attaching additional fasteners to the rigid corner piece 56 through additional holes 58 located on the rear section 10 (as shown in FIG. 7, for example and without limitation).

Rigid corner piece 56 can be secured to one another by support structures 86. Support structures 86 can also be secured to inner surface 54 of the rear section 10, or alternatively, support structures 86 can be secured to outer surface 84 of the rear section 10. Likewise, support structures 86 can be secured to front section 30. Support structures 86 can be integral with rigid corner pieces 56, and can secure pairs of rigid corner pieces 56 opposed along any edges, for example, vertically, as shown in FIG. 1, for example and without limitation, or horizontally, or diagonally across any faces of the luggage 2.

For the purposes of illustration and not limitation, in the exemplary embodiment of FIG. 1, a piece of luggage 2 having eight rigid corner pieces 56 is shown; however, it is contemplated that a piece of luggage 2 can have one, two, four, or any other suitable number of rigid corner pieces 56. Additionally, any number, size, and shape of support structure 86 can be included throughout luggage 2 to provide additional support and resist deformation of the rear section 10 and/or front section 30.

As shown in FIG. 7, for example and without limitation, the rear section 10 can have further edges 60, 62 adjacent a notch 48. The further edges 60, 62 can be folded inward relative inner surface piece 56 forming further sides 16, 20, which are shown in FIG. 1, for example and without limitation. Further sides 16, 20 can be secured to a rigid corner piece 56 in any manner described above. As shown in FIG. 1, for example and without limitation, sides 16, 20 can define the rear section 10 portions of the bottom and right faces 24, 28 of the luggage 2.

Figure 4:
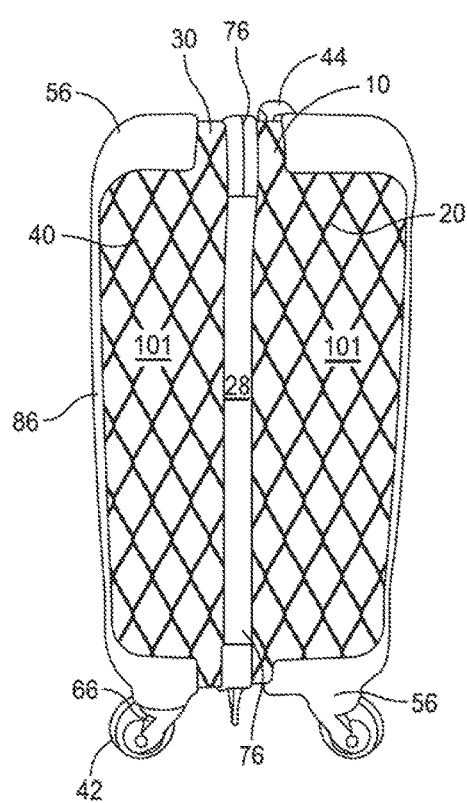
FIG. 4 is a right side view of the piece of luggage of FIG. 1, the left side view being substantially a mirror image of the right side view.
Figure 5:
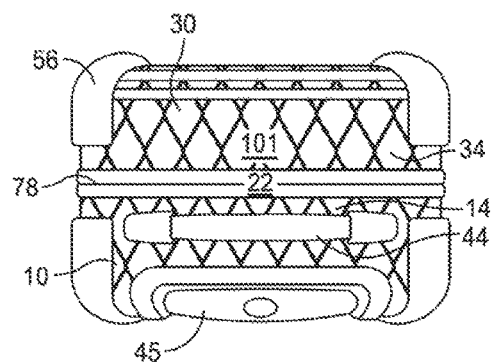
FIG. 5 is a top view of the piece of luggage of FIG. 1.

To facilitate opening and closing of the luggage 2, for example and without limitation, side 20 of the rear section 10 can be permanently secured to the respective side 40 of the front section 30 and can form a hinge. Side 20 of the rear section 10 can be permanently secured to respective side 40 of the front section 30, for example and without limitation, by forming a gusset 76 of material (as best shown in FIG. 4, for example and without limitation) that can function as a hinge to allow the rear section 10 and front section 30 to open apart from each other and allow a user to access the interior of the luggage 2. The gusset 76 can be made of fabric, or any other suitable flexible material. Alternatively, a hinge can be formed by a scoring, by a hinged bracket joint, or any other suitable means.

Rear section 10 and front section 30 can also be formed from a single sheet of the stiff shell material by, for example, joining the two sections 10, 30 at edges 60 and 68. The sheet of joined sections 10, 30 can later be cut, or otherwise separated, along edges 60 and 68 to provide the patterns shown in FIGS. 7 and 8, for example and without limitation. As a further alternative, the edges 60, 68 can be modified to form a hinge, for example by scoring or otherwise deforming the joined edges 60, 68.

To allow selective opening and closing of the luggage 2, for example and without limitation, sides 14, 16, 18 of the rear section 10 can be releasably secured to respective sides 34, 36, 38 of the front section. For example and without limitation, the sides 14, 16, 18 can be releasably secured to sides 34, 36, 38 by a zipper 78 to allow a user to open and close to luggage 2 by unzipping and zipping the luggage 2. Additionally or alternatively, the luggage 2 can be releasably opened and closed by way of a latch, hook, or any other suitable means. Further, a key lock, combination lock, or the like can be added to the above securing mechanisms to prevent unauthorized access to the interior of the luggage 2.

In another exemplary embodiment, for the purpose of illustration and not limitation, the rear section 10 can be further folded to form a top cover to define front face 32 of the luggage 2. In this embodiment, zipper 78 can releasably secure the top cover to the remaining faces of the luggage 2, for example and without limitation, faces 22, 26, 28 to allow a user to access the interior of the luggage 2, and an interface between face 32 and face 24 can act as a hinge. While it is contemplated that the top cover can be formed by the rear section 10, alternatively, the top cover can be formed by a separate piece of material, which may the same type of material as rear section 10, or any other suitable material.

In the four-wheel configuration, rear section 10 and front section 30, as shown in FIGS. 7 and 8, for example and without limitation, can be provided. In the two-wheel configuration, rear section 10 and front section 30, as shown in FIGS. 9 and 10, for example and without limitation, can be provided.

As shown in FIGS. 1 and 11, for example and without limitation, luggage 2 can be provided with a handle 44 and a retractable handle 45. Additionally, a luggage expansion system (not shown) can be incorporated into luggage 2 to allow a user to increase or decrease the interior volume of the luggage 2. Examples of expandable pieces of luggage with substantially rigid frames are shown and described in U.S. Pat. No. 7,281,616 to Peterson et al. and U.S. patent application Ser. No. 13/005,318 to Scicluna, the disclosures of which are incorporated in their entireties by reference herein.

While the disclosed subject matter is described herein in terms of certain exemplary embodiments, those skilled in the art will recognize that various modifications and improvements can be made to the disclosed subject matter without departing from the scope thereof. As such, the particular features claimed below and disclosed above can be combined with each other in other manners within the scope of the disclosed subject matter such that the disclosed subject matter should be recognized as also specifically directed to other embodiments having any other possible permutations and combinations. It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed:

1. A method for producing an article of luggage comprising:
preparing a first layer of hard shell material having a width and a length;
preparing a second layer of hard shell material having a width and a length that is substantially similar to the width and the length of the first layer of hard shell material;
disposing one or more ornamental substrate between at least the first layer of hard shell material and the second layer of hard shell material; and
forming the first layer of hard shell material, the second layer of hard shell material, and the one or more ornamental substrate into a hard luggage shell by heating the first layer of hard shell material, the second layer of hard shell material, and the one or more ornamental substrate together.

2. The method of claim 1, wherein forming the first layer of hard shell material, the second layer of hard shell material, and the one or more ornamental substrate into the hard luggage shell further comprises pressing the first layer of hard shell material, the second layer of hard shell material, and the one or more ornamental substrate together.

3. The method of claim 1 wherein the one or more ornamental substrate is disposed between more than 2 layers of hard shell material having substantially similar widths and lengths.

4. The method of claim 3, further comprising:
preparing a third layer of hard shell material having a width and a length that is substantially similar to the width and the length of the first layer of hard shell material;
cutting openings into the third layer of the hard shell material wherein the openings substantially match a size, shape, and arrangement of the one or more ornamental substrate; and
wherein the step of forming the hard luggage shell further comprises placing the third layer of hard shell material on top of the second layer of hard shell material, such that the openings in the third layer of hard shell material substantially align with the one or more ornamental substrate, and heating the first layer of hard shell material, the second layer of hard shell material, the one or more ornamental substrate, and the third layer of hard shell material together.

5. The method of claim 4, wherein forming the hard luggage shell further comprises pressing the first layer of hard shell material, the second layer of hard shell material, the one or more ornamental substrate, and the third layer of hard shell material together.

6. The method of claim 4 wherein the one or more ornamental substrate is formed from any of plastic, metal, wood, cardboard, styrofoam, and/or foam.

7. The method of claim 6 wherein the hard shell material comprises at least one of polyvinyl chloride (PVC), polyethylene (PE), polypropylene (PP), carbon fiber, and/or Tegris®.

8. The method of claim 7 further comprising:
removing a portion of the first, second, and third layers of hard shell material proximate each corner to define a respective notch at each corner;
folding first and second edges of the first, second, and third layers of hard shell material to form first and second sides of the article of luggage;
folding third and fourth edges of the first, second, and third layers of hard shell material to form third and fourth sides of the article of luggage; and
securing a rigid corner piece to the first and second sides proximate each notch.

9. The method of claim 8 wherein the one or more ornamental substrate is disposed within at least one of the first, second, third, and/or fourth sides of the first, second, and third layers of hard shell material.

10. An article of luggage formed from the method of claim 1.

11. An article of luggage formed from the method of claim 3.

12. An article of luggage formed from the method of claim 4.

13. An article of luggage formed from the method of claim 6.

14. An article of luggage formed from the method of claim 7.

15. An article of luggage formed from the method of claim 8.

16. An article of luggage formed from the method of claim 9.

17. A luggage article comprising:
a front hard luggage shell section and a rear hard luggage shell section, each of the front hard luggage shell section and the rear hard luggage shell section including:
a first layer of hard shell material having a width and a length;
a second layer of hard shell material having a width and a length that is substantially similar to the width and the length of the first layer of hard shell material;
one or more ornamental substrate disposed between at least the first layer of hard shell material and at least the second layer of hard shell material; and
wherein at least the first layer of hard shell material, the second layer of hard shell material, and the one or more ornamental substrate comprise a hard shell section;
wherein the first layer of hard shell material, the second layer of hard shell material, and the one or more ornamental substrate are formed into the hard shell section by heating at least the first layer of hard shell material, the second layer of hard shell material, and the one or more ornamental substrate together.

18. The luggage article of claim 17 wherein the first layer of hard shell material, the second layer of hard shell material, and the one or more ornamental substrate are formed into the hard shell section by pressing at least the first layer of hard shell material, the second layer of hard shell material, and the one or more ornamental substrate together.

19. The luggage article of claim 17 wherein the one or more ornamental substrate comprises a plurality of dots.

20. The luggage article of claim 17 wherein the one or more ornamental substrate comprises a plurality of parallel lines.

21. The luggage article of claim 17 wherein the one or more ornamental substrate comprises a plurality of polygons.

22. The luggage article of claim 17 wherein the one or more ornamental substrate comprises a monogram.

23. The luggage article of claim 17 wherein the one or more ornamental substrate comprises a logo.

24. The luggage article of claim 17 wherein the one or more ornamental substrate is disposed between more than 2 layers of hard shell material having substantially similar widths and lengths.

25. The luggage article of claim 24 further comprising:
a third layer of hard shell material having a width and a length that is substantially similar to the width and the length of the first layer of hard shell material, the third layer of the hard shell material having openings that substantially match a size, shape, and arrangement of the one or more ornamental substrate; and
the third layer of hard shell material is disposed on top of the second layer of hard shell material, such that the openings in the third layer of hard shell material align with the one or more ornamental substrate whereby at least a portion of the one or more ornamental substrate protrudes through the openings.

26. The luggage article of claim 25 wherein the one or more ornamental substrate is formed from any of plastic, metal, wood, cardboard, and/or foam.

27. The luggage article of claim 26 wherein the hard shell material comprises polyvinyl chloride (PVC), polyethylene (PE), polypropylene (PP), carbon fiber, and/or Tegris®.

28. The luggage article of claim 27 wherein:
in at least one of the front hard luggage shell section or the rear hard luggage shell section, the first, second, and third layers of hard shell material have at least one corner wherein a portion of the hard shell material has been removed forming at least one notch proximate the at least one corner, wherein first and second edges of the at least one section adjacent the at least one notch are folded inward relative an inner surface of the at least one section forming first and second sides of the luggage article; and
at least one rigid corner piece secured to the first and second sides proximate the at least one notch; and
wherein third and fourth edges of the first, second, and third layers of hard shell material adjacent a second notch are folded inward relative the inner surface forming third and fourth sides of the luggage article.

29. The luggage article of claim 17 wherein:
at least one of the front hard luggage shell section or the rear hard luggage shell section has at least one corner wherein a portion of the first and second layers of hard shell material have been removed forming at least one notch proximate the at least one corner, wherein first and second edges of the at least one section adjacent the notch are folded inward relative an inner surface of the at least one section forming first and second sides, the first and second sides defining second and third faces of the luggage article; and
at least one rigid corner piece secured to the first and second sides proximate the at least one notch.

30. The luggage article of claim 29, wherein the at least one rigid corner piece is secured to an inner fastening piece disposed on the inner surface of the at least one section of the hard shell material, with the at least one section disposed between the inner fastening piece and the at least one rigid corner piece.

31. The luggage article of claim 30, wherein the at least one rigid corner piece is connected to a second rigid corner piece by a support structure.

\* \* \* \* \*